May 26, 1953  C. J. GOESKE  2,639,572
ATTACHMENT FOR LAWN MOWERS
Filed Jan. 21, 1952
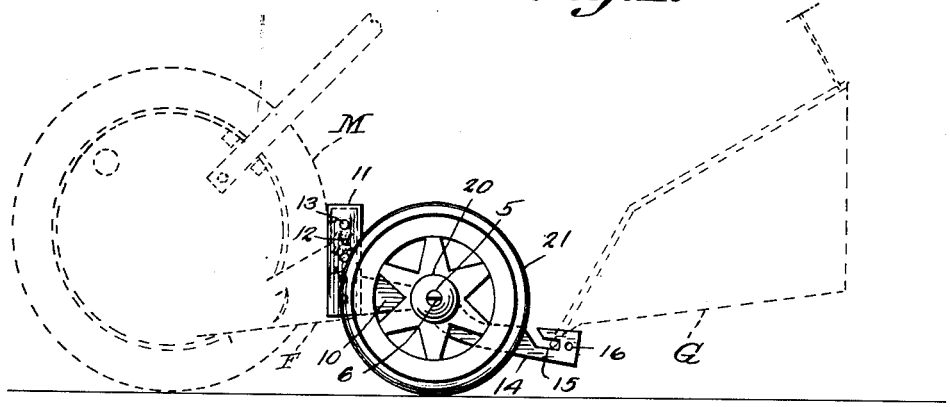
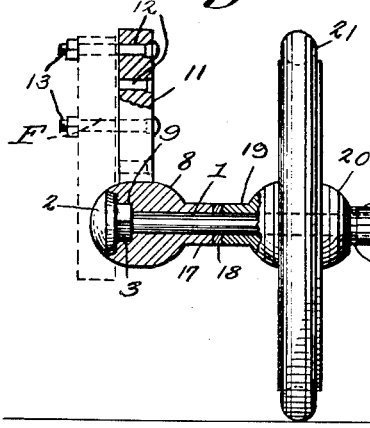
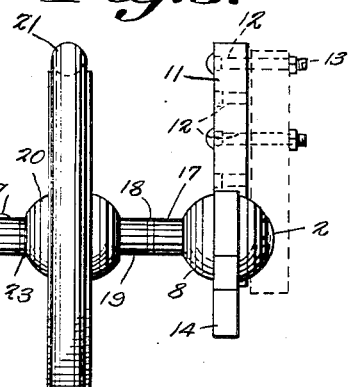
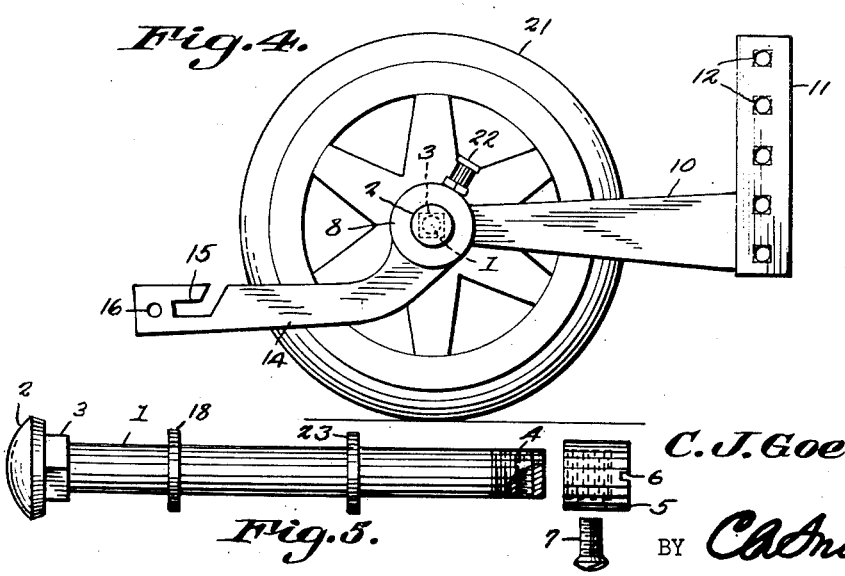
C. J. Goeske
INVENTOR,
BY Snow &Co.
ATTORNEYS.

Patented May 26, 1953

2,639,572

UNITED STATES PATENT OFFICE 2,639,572

ATTACHMENT FOR LAWN MOWERS

Charles J. Goeske, Henryetta, Okla.

Application January 21, 1952, Serial No. 267,374

1 Claim. (Cl. 56—249)

This invention relates to a lawn mower attachment, and more particularly, has reference to a wheel unit novelly designed in a manner to constitute a replacement or substitute for the ground rollers conventionally provided on hand and power mowers.

By way of background, it may be noted that despite the fact that ground rollers are widely used on lawn mowers of various types, said rollers have been found to possess certain disadvantages, which are believed to outweigh such advantages as may be expected to be derived therefrom. Ground rollers are generally so formed as not to roll easily, and over a period of time, produce more and more friction, whereby it becomes increasingly difficult to push the lawn mower.

One important object of the present invention is to provide a lawn mower attachment which will serve to eliminate entirely the ground roller, without detracting in any way from the desirable adjustment means whereby the lawn mower is adapted for cutting grass to various selected heights.

Another important object is to provide a device of the character described which, when mounted upon a mower, will permit the mower to roll more easily, so as to require less effort in pushing the mower.

Still another object is to provide a device of the character stated that is particularly adapted as a replacement for ground rollers provided on mowers already in use, but which will be nevertheless adapted also for embodiment in new mowers during the manufacture thereof.

Yet another object is to provide an attachment as described comprising right and left wheel and bracket units, each unit consisting of a wheel of large diameter and a bracket rockably mounted upon the axle on which said wheel rotates, said bracket extending in opposite directions from said axle and being adapted at one end for connection to a mower frame in selected positions of vertical adjustment, and being adapted at the other end for supporting a grass catcher.

Still another object is to provide an attachment of the character stated which can be manufactured at relatively low cost, and which can be attached to or removed from a mower with speed and facility.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a side elevational view of the right side of the bracket and wheel unit, a portion of a mower, and of a grass catcher being illustrated in dotted lines.

Fig. 2 is an enlarged end elevation, in which portions have been shown in section, showing a left hand wheel and bracket unit, a mower frame being illustrated fragmentarily.

Fig. 3 is an enlarged end elevation of a right hand unit.

Fig. 4 is an enlarged side elevation of one of the units made at the right of the machine showing the side opposite to that illustrated in Fig. 1.

Fig. 5 is an exploded side elevational view, still further enlarged, of the axle bolt.

Referring to the drawing in detail, a conventional hand mower, designated M, has a mower frame F. A conventional grass cather is designated G.

In accordance with the present invention, the ground roller and supporting brackets on which the ground roller is rotatably mounted are removed from the normal position thereof, in which they are regularly connected to the mower frame F, and a pair of right and left wheel and bracket units formed in accordance with the invention is attached to the respective opposite sides of the mower frame.

Considering the formation of each unit, this includes an elongated axle bolt 1 having at one end the rounded head 2 adjacent which is the non-circular portion 3. The opposite end of the bolt is threaded as at 4, to receive the cap nut 5 having the kerf 6 for ready attachment or detachment of the nut from the bolt. When the cap nut has been turned home to the desired position upon the axle bolt 1, it is secured against loosening by the set screw 7 threadable through the side wall of said cap nut 5, the screw 7 passing into the threaded opening 7' of the bolt 1.

Rockably or rotatably mounted upon the shank 1, adjacent the head end of the bolt, is a generally globular body 8, having at one end a recess shaped conformably to the head 2 and non-circular portion 3, so as to prevent relative rotation between the bolt and body. Said recess 9 of the body 8 merges into an axial bore of the body, receiving the shank of the bolt.

The body 8 is integrally formed with a forwardly extending arm 10 which at its front end is integral or otherwise made rigid with an upstanding head 11 having a plurality of vertically spaced square ended openings 12. The head 11 is adapted for attachment to a side of the mower frame 7, and two bolts 13 having squared portions adjacent to the heads thereof are used for effecting a rigid connection between the head and frame, in selected positions of vertical adjustment of the head relative to the frame. It will be readily appreciated that by insertion of the two bolts 13 through selected square ended openings 12, the mower will be adjusted for regulating the cutting heights of the blades.

The body 8 is also integral or otherwise made rigid with a rearwardly extending, downwardly offset grass catcher bracket arm 14 having at its free end a slot 15 in which can be positioned the front portion of the wire frame of a conventional grass catcher G. The arm 14 is also formed with an opening 16, which can be used if the grass catcher is of a type more readily adapted for connection through the medium of the opening 16 than through the slot 15.

The body 8 is formed at its opposite end with a stem or shank 17, and a washer 18 abuts against said stem 17, said washer 18 being loosely mounted upon the axle bolt.

Also abutting against the washer 18 is the tubular lateral extension 19 of a generally globular hub 20 that is integrally or otherwise rigidly formed with a large diameter wheel 21, which is preferably rubber tired.

The wheel is provided with a lubrication well 22. Abutting against the opposite end of the hub 20 is another loose washer 23, engaged by the cap nut 5.

It will be readily appreciated that the wheel is freely rotatable upon the axle bolt, which bolt is held against rotation relative to the bracket body 8, the bracket body 8 being rockably mounted upon said axle bolt. In use, right and left wheel units are attached to the opposite sides of the mower frame, and when the mower is pushed across the grass, it will roll with substantially greater ease than is the case with a conventional roller. Numbers are provided on the outer surfaces of the heads 11 opposite to the openings thereof indicating adjustment points.

A further important characteristic of the construction is that it is inherently adapted for attachment of a grass catcher G, which is readily slipped onto or off the catcher supporting arm 14.

Another important characteristic of the invention resides in its simplicity of construction, and its ready adaptability for use either as a replacement for ground roller units on mowers already in use, or as a part of a new mower under construction. In either event, the attachment can be made with speed and ease, and once the wheel units are attached, the mower will be freed of the friction which has heretofore been accepted as a common and expected characteristic of lawn mowers, particularly the hand operated type.

What is claimed is:

A lawn mower attachment comprising an elongated axle bolt, said axle bolt having a head formed with a non-circular portion, a wheel rotatably mounted upon said axle bolt at the opposite end of the bolt, said opposite end being threaded, said bolt having an opening, a cap nut threaded upon the last-named end of the bolt, a screw extending through the cap nut, passing into said opening, a bracket body rockably mounted upon the head end of the bolt, said bracket having an opening receiving the shank of the bolt and having a recess formed complementarily to the non-circular portion of the bolt head, whereby to prevent relative rotation between said bracket body and bolt, said bracket body being rockable with said bolt, an arm rigid with the bracket body and extending forwardly therefrom, an upstanding head rigid with said arm, said head having a vertical series of openings for attachment of the head to a side of a mower frame in selected positions of vertical adjustment, and a second arm rigid with the bracket body and extending rearwardly from said body, said last-named arm being downwardly offset from the bracket body and having means at its rear end adapted to receive a portion of a grass catcher.

CHARLES J. GOESKE.

References Cited in the file of this patent

UNITED STATES PATENTS

| Number | Name | Date |
|---|---|---|
| 2,275,359 | Gargiule et al. | Mar. 3, 1942 |
| 2,485,312 | Powell | Oct. 18, 1949 |
| 2,546,279 | Stahl | Mar. 27, 1951 |